(12) United States Patent
Tu et al.

(10) Patent No.: US 11,806,892 B2
(45) Date of Patent: Nov. 7, 2023

(54) NO-ADDED FORMALDEHYDE BINDER FOR COMPOSITE WOOD PRODUCT AND THE COMPOSITE WOOD PRODUCT MANUFACTURED BY THE SAME

(71) Applicant: Wanhua Chemical Group Co., Ltd., Shandong (CN)

(72) Inventors: Song Tu, Shandong (CN); Wangshun Qi, Shandong (CN); Houyi Li, Shandong (CN); Weihua Sun, Shandong (CN); Zijun Zhang, Shandong (CN); Bing Lv, Shandong (CN)

(73) Assignee: Wanhua Chemical Group Co., Ltd.

( * ) Notice: Subject to any disclaimer, the term of this patent is extended or adjusted under 35 U.S.C. 154(b) by 815 days.

(21) Appl. No.: 16/612,847

(22) PCT Filed: Jun. 20, 2017

(86) PCT No.: PCT/CN2017/089126
§ 371 (c)(1),
(2) Date: Nov. 12, 2019

(87) PCT Pub. No.: WO2018/227645
PCT Pub. Date: Dec. 20, 2018

(65) Prior Publication Data
US 2020/0198176 A1    Jun. 25, 2020

(30) Foreign Application Priority Data
Jun. 14, 2017  (CN) .......................... 201710447741.8

(51) Int. Cl.
| | | |
|---|---|---|
| *C08G 18/32* | (2006.01) | |
| *B27N 3/00* | (2006.01) | |
| *C08G 18/34* | (2006.01) | |
| *C08G 18/42* | (2006.01) | |
| *C08G 18/67* | (2006.01) | |
| *C08G 18/73* | (2006.01) | |
| *C08G 18/75* | (2006.01) | |
| *C08L 75/06* | (2006.01) | |
| *C09J 175/06* | (2006.01) | |

(52) U.S. Cl.
CPC ......... *B27N 3/002* (2013.01); *C08G 18/3206* (2013.01); *C08G 18/348* (2013.01); *C08G 18/4277* (2013.01); *C08G 18/672* (2013.01); *C08G 18/73* (2013.01); *C08G 18/755* (2013.01); *C08G 18/758* (2013.01); *C08L 75/06* (2013.01); *C09J 175/06* (2013.01); *C08L 2201/54* (2013.01)

(58) Field of Classification Search
CPC ................ C08G 18/348; C08G 18/3206
See application file for complete search history.

(56) References Cited

U.S. PATENT DOCUMENTS

| | | | |
|---|---|---|---|
| 3,996,154 A | 12/1976 | Johnson et al. | |
| 4,944,823 A | 7/1990 | Stofko | |
| 5,455,293 A * | 10/1995 | Wood | C08G 18/10 524/270 |
| 6,224,800 B1 | 5/2001 | Rosthauser | |
| 6,420,478 B1 * | 7/2002 | Irie | C09D 175/06 524/555 |
| 8,895,643 B2 | 11/2014 | Combs et al. | |
| 2003/0009049 A1 | 1/2003 | Smith et al. | |
| 2008/0064844 A1 | 3/2008 | Nagaraj et al. | |
| 2012/0083554 A1 * | 4/2012 | Combs | C08G 18/7664 264/331.19 |
| 2013/0187998 A1 * | 7/2013 | Oh | D06P 5/30 428/206 |
| 2016/0168434 A1 * | 6/2016 | Carlson | C09J 5/06 427/372.2 |
| 2017/0247587 A1 * | 8/2017 | Ma | C08G 18/4211 |

FOREIGN PATENT DOCUMENTS

| | | | |
|---|---|---|---|
| CA | 2312163 A1 | 12/2000 | |
| CN | 1380346 A | 11/2002 | |
| CN | 1951972 A | 4/2007 | |
| CN | 101522741 A | 9/2009 | |
| CN | 101701140 A * | 5/2010 | |
| CN | 101974307 A | 2/2011 | |
| CN | 103153563 A | 6/2013 | |
| CN | 103396526 A | 11/2013 | |
| CN | 104031225 A | 9/2014 | |
| CN | 104290169 A | 1/2015 | |
| CN | 104385424 A | 3/2015 | |
| CN | 104559828 A | 4/2015 | |
| CN | 104672399 A | 6/2015 | |
| CN | 106188465 A | 12/2016 | |
| CN | 106243319 A | 12/2016 | |
| CN | 106433519 A | 2/2017 | |
| JP | S5740575 A | 3/1982 | |

OTHER PUBLICATIONS

Google Translation of CN 101701140 A (Year: 2023).*
(Continued)

*Primary Examiner* — Michael M Dollinger
(74) *Attorney, Agent, or Firm* — Lerner David LLP

(57) ABSTRACT

Disclosed a no-added formaldehyde composite wood product binder, a no-added formaldehyde composite wood product manufactured by same, and a preparation method for the composite wood product. The no-added formaldehyde composite wood product binder comprises an agent A and an agent B. The agent A is an isocyanate-based binder, and the agent B is an aqueous dispersion of polyester based aliphatic polyurethane and/or a modified polyester-based aliphatic polyurethane. The no-added formaldehyde composite wood product is formed under hot-pressing after a wooden and/or straw material is mixed with the no-added formaldehyde composite wood product binder. The composite wood product manufactured by the no-added formaldehyde composite wood product binder has excellent water-proof and mechanical properties and a good saw cutting performance, and the amount of isocyanate used is also reduced, thereby reducing costs.

18 Claims, No Drawings

(56) References Cited

OTHER PUBLICATIONS

Espacenet Translation of CN 101701140 A Description (Year: 2023).*
GB/T 17657-2013 Test Methods of Evaluating the Properties of Wood-based Panels and Surface Decorated Wood-based Panels, Issued on Nov. 2013, pp. 1-122, (English Translation Attached) found at <https://www.chinesestandard.net/PDF.aspx/GBT17657-2013>.
GB/T 2794-2013 Determination for Viscosity of Adhesives-Single Cylinder Rotational Viscometer Method, Issued on Jul. 2013, pp. 1-6, (Partial English Translation Attached) found at <https://www.chinesestandard.net/PDF/English.aspx/GBT2794-2013>.
International Search Report for Application No. PCT/CN2017/089126 dated Feb. 24, 2018, pp. 1-2.
Chinese Search Report for Application No. 201710447741.8 dated Nov. 14, 2019.
Search Report dated Mar. 31, 2020 from Office Action for Chinese Application No. 201710447741.8 dated Apr. 9, 2020. 2 pgs.

* cited by examiner

NO-ADDED FORMALDEHYDE BINDER FOR COMPOSITE WOOD PRODUCT AND THE COMPOSITE WOOD PRODUCT MANUFACTURED BY THE SAME

CROSS REFERENCE TO RELATED APPLICATIONS

The present application is a national phase entry under 35 U.S.C. § 371 of International Application No. PCT/CN2017/089126, filed Jun. 20, 2017, which claims priority from Chinese Patent Application No. 201710447741.8 filed Jun. 14, 2017, all of which are hereby incorporated herein by reference.

TECHNICAL FIELD

The present invention relates to a binder for manufacturing a composite wood product, and more particularly to an isocyanate-based binary binder. Another aspect of the invention relates to a composite wood product manufactured by using the binder and a manufacturing method thereof.

BACKGROUND OF ART

At present, synthetic adhesives commonly used for composite wood products are formaldehyde-based binders, including "three formaldehyde binders" represented by urea-formaldehyde resin (UF), phenolic resin (PF), melamine-formaldehyde resin and the like. These three types of binders all use formaldehyde as a synthetic raw material, and the formaldehyde escapes from their bonded products during production and use, which are regarded as one of the main sources of indoor air pollution. The pollution cycle of these bonded products is long and the formaldehyde is hard to be removed completely, which plagued the development of composite wood product industry.

Due to environmental considerations, no-added formaldehyde isocyanate binders have been more and more widely used in recent years. The isocyanate binder has many advantages except formaldehyde-free, such as high bonding strength, fast curing speed, less stringent requirements on moisture content of wood/straw materials, and excellent physical properties of the panel. However, the use of isocyanates as binders in composite wood products also has disadvantages.

First of all, the unit price of isocyanate is high, which is 8-15 times that of the ordinary urea-formaldehyde resin. Even if the isocyanate's dosage required to meet the same performance requirements of the panel is less than that of ordinary urea-formaldehyde resin, the comprehensive application cost is still high, which is the biggest difficulty for composite wood product companies to widely use isocyanates. U.S. Pat. No. 6,224,800 discloses a method of using solid urea and/or melamine in an amount of 3:1 to 7:1 in combination with isocyanate; this method can be used to reduce the amount of isocyanate and achieve the same performance as adding higher isocyanate amount alone. But the method requires prior mixing solid urea and/or melamine with isocyanate and grind and sift the mixture for a long time, which greatly increases the processing difficulty and the manufacturing cost. U.S. Pat. No. 4,944,823 discloses a method of using sucrose or starch in combination with isocyanate; this method can reduce the loading rate of isocyanate 1% but still achieves the required strength; however the problem for the subsequent mildew of the board will be difficult to be solved due to the use of bio-based binders. U.S. Pat. No. 8,895,643B2 discloses a formula of composite wood product binder comprising a polyphenyl polyisocyanate and at least one aqueous dispersion; the slab made with the formula having the initial tackiness of at least 85% urethane after pre-compression, but the patent does not mention the effect of the aqueous dispersion on the mechanical properties, water resistance, processability, etc.

Secondly, another disadvantage of using the isocyanate as composite wood product binder to make board is that, the wear of parts is more serious than using urea-formaldehyde glue to make board when the board is sawed, cut, etc, and the processing cost is greatly increased, due to the formation of a large number of hard urea structures during the curing process. For example, when cut the composite wood product produced with isocyanate as binder, the life of a typical dicing saw will be reduced by 20-40%.

The waterproof performance (dimensional stability) of composite wood products plays an important role in practical applications. In order to obtain good waterproof performance, various waterproofing agent such as paraffin wax are generally required to be added in the production process of the composite wood products. The chemical constituents of the paraffin wax are saturated normal paraffins with almost no reactive activity. It is an excellent hydrophobic substance and has been regarded as the best waterproofing agent for a long time. For example, the patent CN 104559828 discloses an emulsified paraffin waterproofing agent for particleboard, which is mainly composed of solid paraffin wax, stearic acid and water, used alkyl polyoxyethylene ether and polysorbate as emulsifiers, tripolyphosphate wax as the catalyst, sodium carboxymethyl cellulose as the binder, and is formed by emulsification and saponification at a certain temperature; the waterproofing agent has high solid content and good waterproof performance. However, because paraffin wax does not have any reactive activity, the addition of paraffin wax as the waterproofing agent also hinders the bonding fastness between wood material and wood material; especially when using isocyanate as binder, it will hinder the reaction of isocyanate with active hydrogen in wood. These lead to a decrease in bonding strength. Therefore, in the production of medium (high) density fiberboard and particleboard, whether adding paraffin wax or increasing the amount of paraffin wax will affect the mechanical properties of the product, mainly to reduce the bonding strength of the product. This has been confirmed by the theory and practice since the advent of composite wood product production. In addition, paraffin wax will sublime or evaporate at a high temperature of 180-240° C. during hot pressing of an composite wood product, which may cause problems such as potential fire, increased production cost, and the like.

Therefore, it is important to provide a manufacturing method for preparing a composite wood product having a good waterproof performance, low production cost, good mechanical strength, and low cutting saw wear.

SUMMARY OF THE PRESENT INVENTION

In order to overcome the problems of the prior art mentioned above, the present invention provides a no-added formaldehyde composite wood product binder, comprising agent A and agent B, wherein the agent A is an isocyanate binder, and the agent B is an aqueous dispersion of a polyester-based aliphatic polyurethane and/or a modified polyester-based aliphatic polyurethane.

In the composite wood product binder of the present invention, the isocyanate binder as agent A is polymethylene polyphenyl polyisocyanates and/or its derivative thereof, and has a NCO value of 20-33%, a functionality of 2.1-3.3, and a viscosity of 50-2000 cp (25° C.).

The derivative of the polymethylene polyphenyl polyisocyanate is obtained by reacting of the polymethylene polyphenyl polyisocyanate with a polyol, which can be performed by employing a method for preparing an isocyanate derivative known to those skilled in the art. For example, CN103396526A, CN1380346, and CN101522741 disclose a method for preparing an isocyanate derivative by mixing a polyol with an aliphatic isocyanate respectively, and U.S. Pat. No. 3,996,154 discloses a method for preparing an isocyanate derivative from a polyoxyethylene ether polymer and a polymethylene polyphenyl polyisocyanate. In the present invention, in general, a polyol is added to the polymethylene polyphenyl polyisocyanate, and the reaction of them is carried out at 60 to 80° C. to prepare the derivative of polymethylene polyphenyl polyisocyanate.

Suitable binders of polymethylene polyphenyl polyisocyanates and their derivatives are preferably selected from the Wannate series of polyisocyanates of Wanhua Chemical Group Co., Ltd., including one or more of PM-100, PM-200, PM-400, PM-600. PM-700, CW20, CW30, PM300E, and 9132FC.

In the composite wood product binder of the present invention, the polyester-based aliphatic polyurethane in the aqueous dispersion of a polyester-based aliphatic polyurethane as agent B has a number average molecular weight of 50000 to 500000 Dalton, and a glass transition temperature below 5° C.

The aqueous dispersion of a polyester-based aliphatic polyurethane and/or a modified polyester-based aliphatic polyurethane as agent B of the present invention has a solid content of 20 to 60 wt %, preferably 40 to 60 wt %.

The aqueous dispersion of a polyester-based aliphatic polyurethane can be obtained by high-speed shearing and dispersing of the polyester-based aliphatic polyurethane in water, wherein the polyester-based aliphatic polyurethane is obtained by the polymerization of raw materials comprising an aliphatic diisocyanate, a polyester polyol, a chain extender containing a hydrophilic group, and optionally a chain extender without a hydrophilic group. The preparation method of the aqueous dispersion of a polyester-based aliphatic polyurethane is well known to those skilled in the art, such as the preparation method of an aqueous dispersion of a polyurethane disclosed in CN106243319A, CN106188465A, and CN10431225.

Specifically, in the composite wood product binder of the present invention, the method for preparing the aqueous dispersion of a polyester-based aliphatic polyurethane as agent B may include the following steps:

(1) pre-polymerization: mixing an aliphatic diisocyanate, a polyester polyol, and optionally a chain extender without a hydrophilic group and/or a chain extender containing a hydrophilic group and polymerizing at 50-100° C. to obtain a prepolymer;
(2) dissolution: after cooling, mixing the obtained prepolymer with acetone thoroughly to dissolve the prepolymer;
(3) chain extension: adding a mixture of the chain extender containing a hydrophilic group, water and optionally the chain extender without a hydrophilic group to the prepolymer dissolved in acetone, and then continuing the polymerization reaction at 30-50° C. to obtain the polyester-based aliphatic polyurethane dissolved in acetone;
(4) Dispersion: slowly adding water under a condition of shearing and dispersing and removing the acetone, and then adding an emulsifier optionally to obtain the aqueous dispersion of a polyester-based aliphatic polyurethane.

In the preparation of the polyester-based aliphatic polyurethane by polymerization, the molar ratio of the NCO group in the aliphatic diisocyanate used to the sum of the hydroxyl group and the amino groups in the polyester polyol, the chain extender containing a hydrophilic group, and optionally the chain extender without a hydrophilic group is 1:(0.8-1.4), preferably 1:(0.8-1.2).

As a preferred technical solution, in the preparation of the polyester-based aliphatic polyurethane, the molar ratio of the NCO group in the aliphatic diisocyanate/the hydroxyl group in the polyester polyol/the sum of the hydroxyl group and the amino group in the chain extender containing a hydrophilic group/the sum of the hydroxyl group and the amino group in the chain extender without a hydrophilic group is 1:(0.2-0.9):(0.02-0.3):(0-0.7).

In step (4), the amount of the emulsifier is 0.1 to 0.5% by weight of the aqueous dispersion of the polyester-based aliphatic polyurethane.

In the above preparation method of the present invention, if both step (1) and (3) use the chain extender containing a hydrophilic group and/or both step (1) and (3) use the chain extender without a hydrophilic group, The corresponding components in step (1) and (3) may be the same or different.

In the method for preparing the aqueous dispersion of a polyester-based aliphatic polyurethane, the aliphatic diisocyanate is selected from the group consisting of hexamethylene diisocyanate (HDI), dicyclohexylmethane diisocyanate (HMDI), isophorone diisocyanate (IPDI), cyclohexane dimethylene diisocyanate (HXDI) and any combination thereof.

In the method for preparing the aqueous dispersion of a polyester-based aliphatic polyurethane, the polyester polyol is an adipic acid-based polyester diol, an aromatic polyester polyol or a polycaprolactone-type polyol, and has a number average molecular weight of 400 to 8000 Daltons; preferably the polyester polyol is selected from the group consisting of polybutylene glycol adipate diol (PBA), polyethylene glycol adipate diol (PEA), polypropylene glycol adipate diol (PPA), polydiethylene glycol adipate diol (PDA), polyneopentyl glycol diol (PNA), polyethylene glycol butylene glycol adipate diol (PEBA), polyethylene glycol propylene glycol adipate (PEPA), polyhexamethylene adipate diol (PHA) and polycaprolactone diol (PCL) and any combination thereof, which have a number average molecular weight of 1000-5000 Daltons.

In the method for preparing the aqueous dispersion of a polyester-based aliphatic polyurethane, the hydrophilic group in the chain extender containing a hydrophilic group is selected from the group consisting of a carboxyl group, a sulfonic acid group, an ethoxy group, a propoxy group and ethoxypropoxy groups and any combination thereof. The chain extender containing a hydrophilic group is preferably one or more of dimethylolpropionic acid, dimethylolbutanoic acid, 1,2-dihydroxybutane-1-sulfonic acid, sodium ethylenediamine ethanesulfonate, and sodium salt of N-(2-aminoethyl)-2-aminoethanesulfonic acid.

In the method for preparing the aqueous dispersion of a polyester-based aliphatic polyurethane, the chain extender without a hydrophilic group is not necessarily used. When used, the chain extender without a hydrophilic group is selected from one or more of polyols having a functionality of 2 to 3 and a number of carbon atoms of 2-20, and polyamines having a functionality of 2 to 3 and a number of carbon atoms of 2 to 20, preferably selected from the group consisting of ethylene glycol, 1,4-butanediol, hexanediol, ethylenediamine, propylenediamine, butanediamine, isophoronediamine, 1,4-cyclohexanediamine, 4,4'-diaminodicyclohexylmethane, diethylenetriamine and any combination thereof.

In the method for preparing the aqueous dispersion of a polyester-based aliphatic polyurethane, one or more of emulsifiers may be used. The emulsifiers include the anionic emulsifiers such as sodium dodecyl sulfonate, sodium lauryl sulfate, sodium tridecyl sulfate, sodium succinate sulfonate; or the nonionic emulsifiers such as tridecyl alcohol ethoxylate, oleic acid alcohol ethoxylate, phenol ethylene oxide-propylene oxide, ethylene oxide-propylene oxide, polyoxyethylene sorbitan aliphatic acid ester (Tween).

The modified polyester-based aliphatic polyurethane of the present invention is preferably the polyester-based aliphatic polyurethane modified with a polymerizable vinyl monomer based polymer, which is obtained by chemically bonding of the polyester-based aliphatic polyurethane with a polymer of polymerizable vinyl monomers.

In the modified polyester-based aliphatic polyurethane of the present invention, the polymer of polymerizable vinyl monomers accounts for 5 to 50 wt % of the polyester-based aliphatic polyurethane.

Preferably, the method for preparing the aqueous dispersion of the modified polyester-based aliphatic polyurethane of the present invention comprises the following steps:

(i) adding 0.01 to 2 parts by weight of an emulsifier and an initiator which is used in an amount of 0.1 to 0.5% by weight based on the total amount of the polymerizable vinyl monomers to 100 parts by weight of an aqueous dispersion of a polyester-based aliphatic polyurethane which is to be modified, to form an uniformly dispersed emulsion;

(ii) heating the emulsion to 60-90° C., and then adding the polymerizable vinyl monomer slowly, and maintaining the temperature during the polymerization process until the reaction is complete;

(iii) further adding an initiator which is used in an amount of 0.1 to 0.5% by weight based on the total amount of the polymerizable vinyl monomers, and maintaining the temperature at 60 to 90° C. during the polymerization process until the reaction is completed, to obtain the aqueous dispersion of the modified polyester-based aliphatic polyurethane of the present invention;

Wherein, the aqueous dispersion of a polyester-based aliphatic polyurethane which is to be modified is prepared by the following steps:

(1) pre-polymerization: mixing an aliphatic diisocyanate, a polyester polyol, an hydroxyl group-contained or amino group-contained polymerizable vinyl monomer, and optionally a chain extender without a hydrophilic group and/or a chain extender containing a hydrophilic group and polymerizing at 50-100° C. to obtain a prepolymer;

(2) dissolution: after cooling, mixing the obtained prepolymer with acetone thoroughly to dissolve the prepolymer;

(3) chain extension: adding a mixture of the chain extender containing a hydrophilic group, water and optionally the chain extender without a hydrophilic group to the prepolymer dissolved in acetone, and then continuing the polymerization reaction at 30-50° C. to obtain the polyester-based aliphatic polyurethane which is to be modified dissolved in acetone;

(4) dispersion: slowly adding water under a shearing and dispersing, and removing the acetone, and then adding the optional emulsifier to obtain the aqueous dispersion of the polyester-based aliphatic polyurethane which is to be modified.

That is, except further using the hydroxyl group-contained or amino group-contained polymerizable vinyl monomer in step (1) to participate in the polymerization reaction to obtain a prepolymer, the method for preparing the aqueous dispersion of the polyester-based aliphatic polyurethane which is to be modified is the same as the method mentioned above for preparing the aqueous dispersion of the polyester-based aliphatic polyurethane.

In a preferred embodiment, in step (1), the number of moles of the hydroxyl group-contained or amino group-contained polymerizable vinyl monomer used is 0.2-5% of the number of moles of NCO groups contained in the aliphatic diisocyanate.

The hydroxyl group-contained or amino group-contained polymerizable vinyl monomer includes one or more of hydroxyethyl (meth)acrylate, (meth)acrylic acid-β-hydroxypropyl ester, hydroxybutyl (meth) acrylate, and (meth) acrylamide.

In the method for preparing the aqueous dispersion of a modified polyester-based aliphatic polyurethane of the present invention, the initiator is selected from the group consisting of azo compound initiators, peroxide initiators, and redox initiators and any combination thereof, and preferably selected from the group consisting of azo compound initiators and peroxide initiators and any combination thereof, such as one or more of azobisisobutyronitrile (ABIN), azo-bis-iso-heptonitrile (ABVN), benzoyl peroxide, t-butyl hydroperoxide, dodecanoyl peroxide, t-butyl peroxypivalate and diisopropyl peroxydicarbonate.

In the method for preparing the aqueous dispersion of a modified polyester-based aliphatic polyurethane of the present invention, the emulsifier used may be those defined above.

The polymerizable vinyl monomer is selected from the group consisting of methyl (meth)acrylate, butyl (meth)acrylate, phenyl (meth)acrylate, ethyl (meth)acrylate, (meth) acrylic acid 2-ethylhexyl ester, benzyl (meth)acrylate, (meth)acrylic acid, (meth)acrylamide, styrene, α-alkylstyrene, (meth)acrylonitrile and any combination thereof; preferred selected from the group consisting of methyl (meth) acrylate, butyl (meth)acrylate, phenyl (meth)acrylate, styrene, α-alkylstyrene and ethyl (meth)acrylate and any combination thereof; more preferably, the polyester-based aliphatic polyurethane modified with a polymerizable vinyl monomer based polymer is the polyester-based aliphatic polyurethane modified with a copolymer of a phenyl (meth) acrylate and methyl (meth) acrylate or styrene; wherein the molar ratio of the phenyl (meth) acrylate monomer to the methyl (meth) acrylate or styrene monomer is 1-3:1 in the copolymer.

Preferably, in step (ii), the total mass of the polymerizable vinyl monomer added is about 5 to 50% by weight of the polyester-based aliphatic polyurethane which is to be modified.

Surprisingly, by modifying the polyester-based aliphatic polyurethane with the polymerizable vinyl monomer based polymer, the water resistance and saw ability of the prepared board can be improved. In a preferred embodiment, the weight ratio of agent A to agent B in the no-added formaldehyde composite wood product binder of the present invention is 1-5:1.

In another aspect, the present invention provides a manufacturing method of a no-added formaldehyde composite wood product, the manufacturing method includes the following steps:

(1) diluting agent B (the aqueous dispersion of the polyester-based aliphatic polyurethane and/or a modified polyester-based aliphatic polyurethane) of the no-added formaldehyde composite wood product binder of the present invention with water, wherein the weight ratio of agent B to water is 0.5-4:1, to obtain a diluted agent B having a viscosity of ≤600 cp (25° C.);

(2) adding agent A of the no-added formaldehyde composite wood product binder of the present invention and the diluted agent B to the wood and/or straw material, and then blending the wood and/or straw material with no-added formaldehyde composite wood product binder until the no-added formaldehyde composite wood product binder is uniformly distributed on the wood and/or straw material;

(3) forming and pre-pressing the wood and/or straw material mixed with the no-added formaldehyde composite wood product binder into composite wood products mat;

(4) molding the composite wood products mat pre-formed by hot pressing.

According to the manufacturing method for a no-added formaldehyde composite wood product of the present invention, in step (2), the total addition amount of agent A and agent B of the no-added formaldehyde composite wood product binder is 1-6% by weight, preferably 2-5% by weight of the wood and/or straw material.

According to the manufacturing method for a no-added formaldehyde composite wood product of the present invention, in the above step (2), agent A and the diluted agent B are separately added into the wood and/or straw material in any order. However, more preferably, all or part of agent A with all of the diluted agent B are mixed to obtain a mixture of agent A and agent B, and then add the mixture of agent A and agent B into wood and/or straw material; if the unmixed part of agent A exists, then the unmixed part of agent A is added to wood and/or straw material prior to or after the mixture of agent A and agent B. In this embodiment, preferably, the part of agent A for mixing with the diluted agent B accounts for 40-100% of the total of agent A by weight. The mixing of all or part of agent A and all of agent B diluted with water can be carried out by the mixing with mechanical agitation or the mixing with in-line static mixer.

According to the manufacturing method for a no-added formaldehyde composite wood product of the present invention, in the above steps (1) and (2), the mixing is carried out by the mixing with mechanical agitation or the mixing with in-line static mixer, respectively.

According to the manufacturing method for a no-added formaldehyde composite wood product of the present invention, in step (3), the wood and/or straw material mixed with the no-added formaldehyde composite wood product binder is heated to 40-75° C. before pre-pressing.

According to the manufacturing method for a no-added formaldehyde composite wood product of the present invention, in step (4), the hot pressing temperature is 170-240° C.

According to the manufacturing method for a no-added formaldehyde composite wood product of the present invention, the wood material is selected from the group consisting of poplar, pine, eucalyptus, apple wood, beech and any combination thereof; the straw material is selected from the group consisting of corn stover, straw, wheat straw, sunflower straw, rape stalk, cotton stalk and any combination thereof. The wood material and the straw material are mixed in any ratio. The wood and/or straw material preferably has a moisture content of 1 to 20%.

Depending on the type of the board produced, the wood and/or straw material can first be prepared into particles or fibers. The preparation of fibers or particles is a technique well known to those skilled in the art. For example, CN104290169A describes a method for preparing a wood fiber, and CN104385424A discloses a method for preparing a crop straw shavings. It will be appreciated that the wood and/or straw material described below includes the forms of shavings and/or fibers.

The present invention also provides a no-added formaldehyde composite wood product produced according to the above manufacturing method. In particular, the present invention provides a no-added formaldehyde composite wood product, whose raw material comprising the following components: (1) a wood and/or straw material; (2) the no-added formaldehyde composite wood product binder (the sum of agent A and agent B) of the present invention, the account of which is 1-6 wt %, preferably 2-5 wt % of the wood and/or straw material.

Since the no-added formaldehyde composite wood product binder of the present invention exists between the wood and/or the straw material, the 24 h water absorption thickness expansion ratio of the no-added formaldehyde composite wood product is less than 12%, and more typically less than 10%; the strength of the no-added formaldehyde composite wood product is greater than 0.5 MPa, and in a more typical example is greater than 0.7 MPa (according to the test method specified in GB/T 17657-2013).

The mechanism by which the no-added formaldehyde composite wood product binder of the present invention improves the mechanical properties, water resistance and sawability of the no-added formaldehyde composite wood product, is as follows:

The aqueous dispersion of the polyester-based aliphatic polyurethane and/or the modified polyester-based aliphatic polyurethane contained in the no-added formaldehyde composite wood product binder of the present invention has good adhesion to wood. In the process of mixing with the isocyanate binder, a part of the isocyanate reacts with the reactive group such as a hydroxyl group or a carboxyl group on the structure of the polyester-based aliphatic polyurethane and/or modified polyester-based aliphatic polyurethane to form a network structure having excellent adhesion properties. This network structure enhances the mechanical properties of the board on one hand and enhances the water resistance of the board on the other hand. Especially when the polyester-based aliphatic polyurethane is modified with a vinyl monomer polymer, since the vinyl monomer polymer is microphase-separated and filled in the binder of the binder system, the hardness of the binder is further lowered, and the wear-resistant performance of saw blade is better. At the same time, its water resistance is improved due to the hydrophobic property of the vinyl monomer polymer, which makes it difficult for moisture to penetrate into the binder. In particular, in the case that all or part of the isocyanate binder is fully mixed with the aqueous dispersion and the mixture obtained is then sized, the aqueous dispersion encapsulates and consumes the isocyanate, reducing the reaction of the isocyanate with water which will form a hard polyurea structure (the main reason for poor sawing performance). At the same time, due to the coverage of the wood surface by the aqueous dispersion, the possibility of chemical bonding of the isocyanate to the wood is also reduced, so the wear of the saw blade during sawing can be reduced.

Therefore, the no-added formaldehyde composite wood product produced by using the no-added formaldehyde composite wood product binder of the present invention has good mechanical properties, excellent water repellency, and the cost of the binder is reduced, at the same time the wear of the saw is markedly reduced during subsequent processing.

EMBODIMENT

The following examples are intended to better illustrate the effects of the manufacturing method for a no-added formaldehyde composite wood product of the present invention, and the specific selection of the components, methods and the like in the following examples listed below do not limit the scope of the invention.

Products used in the examples:

PCL, polycaprolactone diol, Japan Daicel Chemical Industry Co., Ltd.;

PBA, polybutylene adipate diol, Huada Chemical Co., Ltd.;

PEA, polyethylene glycol adipate diol, Huada Chemical Co., Ltd.;

PHA, polyhexamethylene adipate diol, Huada Chemical Co., Ltd.;

HDI, hexamethylene diisocyanate, Wanhua Chemical Group Co., Ltd.;

HMDI, dicyclohexylmethane diisocyanate, Wanhua Chemical Group Co., Ltd.;

IPDI, isophorone diisocyanate, Wanhua Chemical Group Co., Ltd.;

HXDI, cyclohexane dimethylene diisocyanate, Mitsui Takeda, Japan;

TDI, toluene diisocyanate, Bosu Chemical;

HMDA, 4,4'-diaminodicyclohexylmethane, Wanhua Chemical Group Co., Ltd.;

IPDA, isophorone diamine, Wanhua Chemical Group Co., Ltd.;

DMPA, dimethylolpropionic acid, Perstorp, Sweden;

Dimethylol butyric acid, Jintenglong Chemical;

A95, sodium N-(2-aminoethyl)-2-aminoethanesulfonate, EVONIC, Germany;

PTMEG, polytetramethylene ether glycol, PTG Korea.

The number average molecular weight was measured by a gel chromatograph (Hewlett Packard, Inc. HP100 type), and the chromatographic column was HP PL gel MIXED-B. The standard sample is the narrowly distributed polystyrene.

The sample was dissolved in mobile phase tetrahydrofuran to prepare a 1.5 g/L solution, which was filtered and injected. The injection volume was 400 μL, the column pressure was 5.0 MPa, and the flow rate was 1.5 ml/min.

The measurement of the glass transition temperature was measured by differential scanning calorimetry (DSC). Using METTLER TOLEDO's DSC3 differential scanning calorimeter, the test range is −100~30° C., the sample weighs 8~12 mg, and the sample is cooled to −100° C. under liquid nitrogen protection, then the DSC curve was obtained under heating conditions with the heating rate of 10° C./min, and the glass transition temperature is determined. The viscosity was measured using a Brookfield LV rotary viscometer according to the method specified in GB/T 2794.

EXAMPLES

Example 1

(1) Preparation of an Aqueous Dispersion of a Polyester-Based Aliphatic Polyurethane 26.2 g HMDI, 16.8 g HDI, 170.0 g PCL-2000 (the number after the reagent is the number average molecular weight of this reagent, the same below), 4.0 g 1,4-butanediol and 1.0 g DMPA were added to a reaction vessel, and the temperature was raised to 70-80° C. to carry out the reaction. When the NCO value reached 2.41%, the prepolymer was cooled to 40° C., and then was diluted with 350 g acetone. The temperature was kept at 40-45° C. for 10 min for mixing. 2.14 g ethylenediamine and 5.0 g A95 were uniformly mixed in 15 g deionized water, and the mixed solution obtained was added to the reaction vessel in about 1 minute. When the mixed solution was completely added, the timing was started, and the reaction was carried out at 30-50° C. for 10 min. Stirring was maintained at 1500-2000 rpm/min, and 0.34 g triethylamine was added and neutralized for 5 min with stirring to bring the pH to 6-9. 185 g of deionized water was added under shearing-dispersing for a period of 10 min. The acetone was removed under vacuum, and then 0.1 wt % Tween-20 emulsifier was added to obtain an aqueous dispersion of a polyester-based aliphatic polyurethane (agent B) having a solid content of 52.9 wt %. The polyester-based aliphatic polyurethane in the aqueous dispersion which was tested by gel chromatography and DSC had a number average molecular weight of 112,000 Daltons and a glass transition temperature of −20° C.

(2) Preparation of Board

Poplar particles with a moisture content of 8-10% by weight were used as wood substrates for a board pressing test. 2000 g surface poplar particles were weighed and added into a blender. 20 g agent B prepared in this example was diluted with 10 g deionized water, and the viscosity of agent B after dilution was 100 cp (25° C.). 50 g polymethylene polyphenyl polyisocyanate PM-200 (agent A; Wanhua Chemical Group Co., Ltd.) was weighed, and 20 g agent A which is from the 50 g agent A was mixed with the above diluted agent B to obtain a mixture of agent A and agent B. A spray gun was connected to an air compressor, and 30 g unmixed agent A and the above mixture of agent A and agent B were sequentially sprayed by the spray gun into the blender under stirring to stir for 40-60 s. Adding the binder to central layer particles was then carried out in accordance with the same process.

Then, according to a paving ratio of 360 g surface particles+980 g central layer particles+360 g surface particles, those particles to which the binder had been added were paved in a 350 mm*350 mm*100 mm mold, and then heated to 40° C. for pre-pressing with a pre-pressing pressure of 1 Mpa and a pre-pressing time of 1 min. The prepressed slab was pressed into a board on a hot press. The temperature of pressing into board was 170° C., the relative pressure was 1.5-2 MPa and a hot press cycle was 200 s, to obtain a board, and the thickness of the board was controlled to 18 mm After the completion of the pressing, the properties of the board were tested in accordance with the method specified in GB/T-17657-2013.

Example 2

(1) Preparation of an Aqueous Dispersion of a Polyester-Based Aliphatic Polyurethane 10.0 g IPDI, 40.0 g HDI, 200.0 g PBA-2000, and 8.0 g 1,4-butanediol were added to the reaction vessel, and the temperature was raised to 70-80° C. to carry out the reaction. When the NCO value reached 3.04%, the prepolymer was cooled to 40° C. and then was diluted with 300 g acetone. The temperature was maintained at 40-45° C. for 10 min for mixing. 10 g IPDA and 5.0 g A95 were uniformly mixed in 15 g deionized water, and the mixed solution obtained was added to the reaction vessel in about 1 minute. When the mixed solution was added completely, the timing was started, and the reaction was carried out at 30-50° C. for 10 min. Stirring was maintained at 1500-2000 rpm, and 385 g deionized water was added under shearing-dispersing for a period of 10 min. The acetone was removed under vacuum, and then 0.1 wt % Tween-20 emulsifier was added to obtain an aqueous dispersion of a polyester-based aliphatic polyurethane (agent B) having a solid content of 40.6 wt %. The polyester-based aliphatic polyurethane in the aqueous dispersion which was tested by gel chromatography and DSC had a number average molecular weight of 485,000 Daltons and a glass transition temperature of −30° C.

(2) Preparation of Board

Pine wood particles with a moisture content of 8-10% by weight were used as wood substrates for a board pressing test. 2000 g surface pine particles were weighed and added into a blender. 40 g agent B prepared in this example was diluted with 20 g deionized water, and the viscosity of agent B after dilution was 550 cp (25° C.). 80 g polymethylene polyphenyl polyisocyanate PM-200 (A agent; Wanhua Chemical Group Co., Ltd.) was weighed, and 32 g agent A which is from the 80 g agent A was mixed with the above diluted agent B to obtain a mixture of agent A and agent B. A spray gun was connected to the air compressor, and the above mixture of agent A and agent B and 58 g unmixed PM-200 were sequentially sprayed by the spray gun into the blender under stirring to stir for 40-60 s. Adding the binder to central layer particles was then carried out in accordance with the same process.

Then, according to a paving ratio of 360 g surface particles+980 g central layer particles+360 g surface particles, those particles to which the binder had been added were paved in a 350 mm*350 mm*100 mm mold, and then heated to 75° C. for pre-pressing, with a pre-pressing pressure of 1 Mpa and a pre-pressing time of 1 min. The prepressed slab was pressed into a board on a hot press. The temperature of pressing into board was 240° C., the relative pressure was 1.5-2 MPa and a hot pressing cycle was 200 s, to obtain a board, and the thickness of the board was controlled to 18 mm After the completion of the pressing, the properties of the board were tested in accordance with the method specified in GB/T-17657-2013.

Example 3

(1) Preparation of an Aqueous Dispersion of a Polyester-Based Aliphatic Polyurethane 80 g HXDI, 100.0 g PEA-400, 8.0 g 1,4-butanediol, and 2.0 g DMPA were added to the reaction vessel, and the temperature was raised to 70-80° C. to carry out the reaction. When the NCO value reached 2.13%, the prepolymer was cooled to 40° C., and then was diluted with 300 g acetone. The temperature was kept at 40-45° C. to for 10 min for mixing. 4 g IPDA and 5.0 g A95 were uniformly mixed in 15 g deionized water, and the mixed solution obtained was added to the reaction vessel in about 1 minute. When the mixed solution was completely added, the timing was started, and the reaction was carried out at 30-50° C. for 10 min. Stirring was maintained at 1500-2000 rpm/min, and 400 g deionized water was added under shearing-dispersing for a period of 10 min. The acetone was removed under vacuum, and then 0.1 wt % Tween-20 emulsifier was added to obtain an aqueous dispersion of a polyester-based aliphatic polyurethane (agent B) having a solid content of 32.4% by weight. The polyester-based aliphatic polyurethane in the aqueous dispersion which was tested by gel chromatography and DSC had a number average molecular weight of 325,000 Daltons and a glass transition temperature of −14° C.

(2) Preparation of Board

Poplar particles with a moisture content of 8-10% by weight were used as wood substrates for a board pressing test. 2000 g surface poplar particles were weighed into a blender. 40 g agent B prepared in this example was diluted with 20 g deionized water, and the viscosity of agent B after dilution was 80 cp (25° C.). 80 g polymethylene polyphenyl polyisocyanate PM-200 (agent A; Wanhua Chemical Group Co., Ltd.) was weighed, and a spray gun was connected to the air compressor, and then the above 80 g agent A and the diluted agent B are sequentially sprayed by the spray gun into the blender under stirring to stir for 40-60 s. Adding the binder to central layer particles was then carried out in accordance with the same process.

Then, according to the paving ratio of 360 g surface particles+980 g central layer particles+360 g surface particles, those particles to which the binder had been added were paved in a 350 mm*350 mm*100 mm mold, and then heated to 50° C. for pre-pressing with a pre-pressing pressure of 1 Mpa, a pre-pressing time of 1 min. The prepressed slab was pressed into a board on a hot press. The temperature of pressing into board was 240° C., the relative pressure was 1.5-2 MPa and a hot pressing cycle was 200 s, to obtain a board, and the thickness of the board was controlled to 18 mm. After the completion of the pressing, the properties of the board were tested in accordance with the method specified in GB/T-17657-2013.

Example 4

(1) Preparation of an Aqueous Dispersion of a Polyester-Based Aliphatic Polyurethane 50.0 g HDI, 105.0 g PBA-500, 50.0 g PHA-5000, 4.0 g 1,4-butanediol, 1.0 g DMPA were added to the reaction vessel, and the temperature was raised to 70-80° C. to carry out the reaction. When the NCO value reached 1.98%, the prepolymer was cooled to 40° C., and then was diluted with 300 g acetone. The temperature was kept at 40-45° C. for 10 min for mixing. 6.0 g HMDA and 2.0 g dimethylolbutanoic acid were uniformly mixed in 15 g deionized water, and the mixed solution obtained was added to the reaction vessel in about 1 minute. When the mixed solution was completely added, the timing was started, and the reaction was carried out at 30-50° C. for 10 min. Stirring was maintained at 1500-2000 rpm/min, and 400 g deionized water was added under shearing-dispersing for a period of 10 min. The acetone was removed under vacuum, and then 0.1 wt % Tween-20 emulsifier was added to obtain an aqueous dispersion of a polyester-based aliphatic polyurethane (agent B) having a solid content of 34.4% by weight. The polyester-based aliphatic polyurethane in the aqueous dispersion, which was tested by gel chromatography and DSC had a number average molecular weight of 224,000 Daltons and a glass transition temperature of −25° C.

(2) Preparation of Board

The mixed fiber of eucalyptus and poplar with a moisture content of 8-10% by weight was used as a wood substrate for a board pressing test, and the mixing ratio of the mixed fiber was 1/1. 2000 g the mixed fiber was weighed into a blender. 20 g agent B prepared in this example was diluted with 10 g deionized water, and the viscosity of agent B after dilution was 350 cp (25° C.). 60 g emulsifiable isocyanate PM300E (agent A; Wanhua Chemical Group Co., Ltd.) was weighed, and 40 g agent A of the 60 g agent A and the diluted agent B were mixed and stirred to obtain the mixture of agent A and agent B. A spray gun is connected to the air compressor, and 20 g the unmixed agent A and the above-mentioned mixture of agent A and agent B were sequentially sprayed by the spray gun into the blender under stirring to stir for 40-60 s.

Then, the fibers to which the binder had been added were paved in a 350 mm*350 mm*100 mm mold, and the temperature was raised to 40° C. for pre-pressing with a pre-pressing pressure of 1 MPa and a pre-pressing time of 1 min. The prepressed slab was pressed into a board on a hot press. The temperature of pressing into board was 240° C., a relative pressure was 1.5-2 MPa and a hot pressing cycle was 200 s, to obtain a board, and the thickness of the board was controlled to 18 mm After the completion of the pressing, the properties of the board were tested in accordance with the method specified in GB/T-17657-2013.

Example 5

(1) Preparation of an Aqueous Dispersion of a Modified Polyester-Based Aliphatic Polyurethane 30.0 g HDI, 225.0 g PHA-3000, 6.0 g 1,6-hexanediol, 2.0 g DMPA, 0.25 g hydroxyethyl methacrylate were added to the reaction vessel, and the temperature was raised to 70-80° C. for reaction. When the NCO value reached 7.65%, the prepolymer was cooled to 40° C., and then was diluted with 300 g acetone. The temperature was maintained at 40-45° C. for 10 min for mixing. 10 g HMDA and 5.0 g A95 were uniformly mixed in 15 g deionized water, and the mixed solution obtained was added to the reaction vessel in about 1 minute. When the mixed solution was completely added, the timing was started, and the reaction was carried out at 30-50° C. for 10 min Stirring was maintained at 1500-2000 rpm/min, and 600 g deionized water was added under shearing-dispersing for a period of 10 min. The acetone was removed under vacuum, and then 0.1 wt % Tween-20 emulsifier was added to obtain 894 g aqueous dispersion of the polyester-based aliphatic polyurethane which is to be modified having a solid content of 31.2% by weight.

Then, 1.5 g sodium dodecyl sulfonate was added to 894 g the aqueous dispersion obtained above, and when the temperature was gradually raised to 60° C., 0.15 g ammonium persulfate was added as a polymerization initiator. Meanwhile, 84 g phenyl methacrylate and 42 g methyl methacrylate were uniformly and slowly dropped into the reaction vessel in 3 hours, and the reaction carried on at 80° C. for 2 h, then 0.15 g ammonium persulfate was added. The reaction vessel was heated to 85° C. to continue the reaction for 1 h, then cooled to 50° C. and discharged, to obtain an aqueous dispersion of a modified polyester-based aliphatic polyurethane (agent B) having a solid content of 39.7%. The modified polyester-based aliphatic polyurethane in the aqueous dispersion had a number average molecular weight of 486,000 Daltons and a glass transition temperature of −2° C. by gel chromatography test and DSC test.

(2) Preparation of Board

A mixed fiber of eucalyptus and straw having a moisture content of 8-10% by weight was used as a wood substrate for a board pressing test, and the mixing ratio of the mixed fiber was 1/1. 2000 g the mixed fiber was weighed into a blender. 20 g agent B prepared in this example was diluted with 40 g deionized water, and the viscosity of agent B after dilution was 5 cp (25° C.). 50 g polyphenylpolymethylene polyisocyanate CW30 (agent A; Wanhua Chemical Group Co., Ltd.) was weighed, and 30 g agent A of the 50 g agent A and the diluted agent B were mixed well to obtain the mixture of agent A and agent B. A spray gun is connected to the air compressor, and 10 g the unmixed agent A and the above mixture of agent A and agent B were sequentially sprayed by the spray gun into the blender under stirring to stir for 40-60 s.

Then, the fibers to which the binder had been added were paved in a 350 mm*350 mm*100 mm mold, and the temperature was raised to 40° C. for pre-pressing with a pre-pressing pressure of 1 Mpa and a pre-pressing time of 1 min. The prepressed slab was pressed into a board on a hot press. The temperature of pressing into board was 240° C., a relative pressure was 1.5-2 MPa and a hot pressing cycle was 200 s, to obtain a board, and the thickness of the board was controlled to 18 mm After the completion of the pressing, the properties of the board were tested in accordance with the method specified in GB/T-17657-2013.

Example 6

(1) Preparation of an Aqueous Dispersion of a Modified Polyester-Based Aliphatic Polyurethane 20.0 g HMDI, 18.0 g IPDI, 300.0 g PBA-4000, 6.0 g 1,6-hexanediol, 2.0 g DMPA, 0.5 g hydroxyethyl methacrylate were added to the reaction vessel, and the temperature was raised to 70-80° C. When the NCO value reached 2.35%, the prepolymer was cooled to 40° C., and then was diluted with 300 g acetone. The temperature was kept at 40-45° C. for 10 min for mixing. 10 g HMDA and 2.0 g A95 were uniformly mixed in 15 g deionized water, and the mixed solution obtained was added to the reaction vessel in about 1 minute. When the mixed solution was completely added, the timing was started, and the reaction was carried out for 10 min Stirring was maintained at 1500-2000 rpm/min, and 500 g deionized water was added under shearing-dispersing for a period of 10 min. The acetone was removed under vacuum, and then 0.1 wt % Tween-20 emulsifier was added to obtain 874 g aqueous dispersion of the polyester-based aliphatic polyurethane which is to be modified having a solid content of 41.1% by weight.

Then, 1.5 g sodium dodecyl sulfonate was added to 874 g the aqueous dispersion obtained above, and when the temperature was gradually raised to 60° C., 0.04 g ammonium persulfate was added thereto, and 18.0 g phenyl methacrylate and 13.0 g styrene was uniformly and slowly dropped in 3 hours. The reaction was carried on at 80° C. for 2 h, then 0.04 g ammonium persulfate added. The reaction vessel was heated to 85° C. to continue the reaction for 1 h, then cooled to 50° C. and discharged, to obtain an aqueous dispersion of a modified polyester-based aliphatic polyurethane (agent B) having a solid content of 43.1 wt %. The modified polyester-based aliphatic polyurethane in the aqueous dispersion had a number average molecular weight of 220,000 Daltons and a glass transition temperature of −18° C. by gel chromatography test and DSC test.

(2) Preparation of Board

Mixed fibers of eucalyptus and straw having a moisture content of 8-10% by weight was used as a wood substrate for a board pressing test, and the mixing ratio of the mixed fiber was 1/1. 2000 g the mixed fibers were weighed into a blender. 20 g agent B prepared in this example was diluted with 40 g deionized water, and the viscosity of agent B after dilution was 50 cp (25° C.). 60 g polyphenylpolymethylene polyisocyanate CW20 (agent A; Wanhua Chemical Group Co., Ltd.), and 30 g agent A of the 60 g agent A and the diluted agent B were mixed uniformly to obtain the mixture of agent A and agent B. A spray gun was connected to the air compressor, and 30 g the unmixed agent A and the above mixture of agent A and agent B were sequentially sprayed by the spray gun into the blender under stirring to stir for 40-60 s.

Then, the fibers to which the binder had been added were paved in a 350 mm*350 mm*100 mm mold and pre-pressed with a pre-pressure of 1 Mpa and a pre-pressure time of 1 min. The prepressed slab was pressed into a board on a hot press. The temperature of pressing into board was 240° C., a relative pressure was 1.5-2 MPa and a hot pressing cycle was 200 s, to obtain a board, and the thickness of the board is controlled to 18 mm After the completion of the pressing, the properties of the board were tested in accordance with the method specified in GB/T-17657-2013.

Comparative Example 1

Poplar particles with a moisture content of 8-10% by weight were used as wood substrates for a board pressing test. 2000 g surface poplar shavings were weighed and added into a blender. 50 g polymethylene polyphenyl polyisocyanate PM-200 (Wanhua Chemical Group Co., Ltd.) was weighed. A spray gun was connected to the air compressor, and the PM-200 above was sprayed by the spray gun into the blender under stirring to stir for 40-60 s. Adding the binder to central layer particles was then carried out in accordance with the same process.

Then, according to a paving ratio of 360 g surface particles+980 g central layer particles+360 g surface particles, those particles to which the binder had been added were paved in a 350 mm*350 mm*100 mm mold, and then heated to 40° C. for pre-pressing with a pre-pressing pressure of 1 Mpa and a pre-pressing time of 1 min. The prepressed slab was pressed into a board on a hot press. The temperature of pressing into board was 170° C., a relative pressure was 1.5-2 MPa and a hot pressing cycle was 200 s, and the thickness of the board was controlled to 18 mm After the completion of the pressing, the properties of the board were tested in accordance with the method specified in GB/T-17657-2013.

Comparative Example 2

Mixed fibers of eucalyptus and poplar with a moisture content of 8-10% by weight were used as the wood substrate for a board pressing test, and the mixing ratio of the mixed fibers was 1/1. 2000 g of the mixed fibers was weighed and added into a blender, and 60 g emulsifiable isocyanate PM300E (Wanhua Chemical Group Co., Ltd.) was weighed. A spray gun was connected to the air compressor, and the PM300E above was sprayed by the spray gun into the blender under stirring to stir for 40-60 s.

Then, the fibers to which the binder had been added were paved in a 350 mm*350 mm*100 mm mold, and heated to 40° C. for pre-pressing with a pre-pressing pressure of 1 Mpa and a pre-pressing time of 1 min. The prepressed slab was pressed into a board on a hot press. The temperature of pressing into board was 240° C., a relative pressure was 1.5-2 MPa and a hot pressing cycle was 200 s, to obtain a board, and the thickness of the board was controlled to 18 mm. After the completion of the pressing, the properties of the sheet were tested in accordance with the method specified in GB/T-17657-2013.

Comparative Example 3

(1) Preparation of an Aqueous Dispersion of Polyether-Type Aromatic Polyurethane 40.0 g TDI, 300.0 g PTMEG-3000, 4.0 g 1,4-butanediol and 1.0 g DMPA were added to the reaction vessel, and the temperature was raised to 70-80° C. to carry out the reaction. When the NCO value reached 2.89%, the prepolymer was cooled to 40° C., and then was diluted with 300 g acetone. the temperature was maintained at 40-45° C. for 10 min for mixing. 6 g HMDA and 2.0 g dimethylolbutanoic acid were uniformly mixed in 15 g deionized water, and the mixed solution obtained was added to the reaction vessel in about 1 minute. When the mixed solution was completely added, the timing was started, and the reaction was carried out at 30-50° C. for 10 min. Stirring was maintained at 1500-2000 rpm/min, and 280 g deionized water was added under shearing-dispersing for a period of 10 min. The acetone was removed under vacuum, and then 0.1 wt % Tween-20 emulsifier was added to obtain an aqueous dispersion of a polyether-type aromatic polyurethane (agent B') having a solid content of 54.5% by weight. The number average molecular weight of the polyether-type aromatic polyurethane in the aqueous dispersion which was tested by gel chromatography was 334,000 Daltons.

(2) Preparation of Board

Mixed fibers of eucalyptus and poplar with a moisture content of 8-10% by weight was used as the wood substrate for a board pressing test, and the mixing ratio of the mixed fibers was 1/1. 2000 g the mixed fibers were weighed and added into a blender. 20 g agent B' prepared in this comparative example was diluted with 10 g deionized water, and the viscosity after dilution was 350 cp (25° C.). 60 g emulsifiable isocyanate PM300E (agent A; Wanhua Chemical Group Co., Ltd.) was weighed, and 40 g agent A of the 60 g agent A was mixed with the diluted agent B' and stirred to obtain the mixture of agent A and agent B'. A spray gun was connected to the air compressor, and 20 g the unmixed agent A and the above mixture of agent A and agent B' were sequentially sprayed by the spray gun into the blender under stirring to stir for 40-60 s.

Then, the fibers to which the binder had been added were paved in a 350 mm*350 mm*100 mm mold, and then heated to 40° C. for pre-pressing with a pre-pressing pressure of 1 Mpa and a pre-pressing time of 1 min. The prepressed slab was pressed into a board on a hot press. The temperature of pressing into board was 240° C., a relative pressure was 1.5-2 MPa and a hot pressing cycle was 200 s, to obtain a board, and the thickness of the board was controlled to 18 mm. After the completion of the pressing, the properties of the board were tested in accordance with the method specified in GB/T-17657-2013.

TABLE 1

Comparison of board properties

| | Adding amount of agent A (weight %) | Adding amount of agent B (B') (weight %) | Sizing method | Type of wood substrate | Density (g/cm³) | Internal bond strength (MPa) | Modulus of Rupture (MPa) | Modulus of Elasticity (MPa) | 24 h thickness swelling (%) | Durability of saw blade * (m) |
|---|---|---|---|---|---|---|---|---|---|---|
| Example 1 | 2.5% | 1% | Partial mixing before sizing | particle board | 676 | 0.72 | 22.1 | 2210 | 8.2 | 3500 |
| Example 2 | 4% | 2% | Partial mixing before sizing | particle board | 672 | 0.94 | 33.2 | 3106 | 5.6 | 3100 |
| Example 3 | 4% | 2% | Sizing separately | particle board | 681 | 0.86 | 30.7 | 3022 | 6.6 | 2600 |
| Example 4 | 3% | 1% | Partial mixing before sizing | Fiber board | 842 | 1.69 | 64.1 | 4806 | 8.1 | 2700 |
| Example 5 | 2.5% | 1% | Partial mixing before sizing | particle board | 670 | 0.74 | 28.4 | 2730 | 7.2 | 3800 |
| Example 6 | 3% | 1% | Partial mixing before sizing | Fiber board | 841 | 1.71 | 66.2 | 4961 | 7.2 | 3100 |
| Comparative example 1 | 2.5% | 0% | — | particle board | 684 | 0.54 | 20.4 | 2106 | 12 | 3000 |
| Comparative example 2 | 3% | 0% | — | Fiber board | 844 | 1.42 | 49.6 | 3958 | 11.6 | 2400 |
| Comparative example 3 | 3% | 1% | Partial mixing before sizing | Fiber board | 832 | 1.20 | 43.2 | 3800 | 12.4 | 2400 |

* Durability test of saw blade is carried out according to the standard JB-T9951-1999 wood working carbide circular saw blade durability test. The durability is expressed by the total length of the cutting plate when the average wear VB value behind the top edge of the saw blade is 0.5 mm.

Comparing the properties of the above boards, it can be seen that the sizing amount of the isocyanate binder in example 1 and that in comparative example Tare equivalent (2.5%), and since the aqueous dispersion of the polyester-based aliphatic polyurethane is added in example 1, the mechanical properties, water resistance and durability of the board are all improved, which indicates that the addition of the aqueous dispersion of polyester-based aliphatic polyurethane contributes to the improvement of mechanical properties, water resistance and sawability of the board. The same trend can also be observed in the fiberboard (Example 4 and Comparative Example 2). Comparing Example 1 with Example 5, and Example 4 with Example 6, it can be seen that the water resistance property and the durability of the board obtained by adding the aqueous dispersion of polyester-based aliphatic polyurethane modified with vinyl monomer is better than the properties of the board obtained by adding the aqueous dispersion of unmodified polyester-based aliphatic polyurethane, which indicates that the addition of the aqueous dispersion of the modified polyester-based aliphatic polyurethane is more favorable for the comprehensive performance of the board.

As can be seen from the comparison of Examples 2 with 3, with a higher addition amount of the isocyanate binder, the durability of the saw blade used in the condition that the binder was mixed before sizing is better than that of the saw blade used in the condition that the binder was sized separately. The reason is that the sizing using mixed binder allows the isocyanate to react with the polyester-based aliphatic polyurethane with less hard-to-cut polyurea structure obtained, resulting in increased durability of the saw blade.

It can be seen from Example 4, Comparative Example 2 and Comparative Example 3 that the mechanical properties and water resistance of the board prepared by adding the aqueous dispersion of aromatic polyether-type polyurethane (Comparative Example 3) is worse than that of the board prepared by adding the aqueous dispersion of polyester-based aliphatic polyurethane, and even worse than that of the board not added with agent B (Comparative Example 2) under the condition of same sheet preparation process, the main reason of which is that the polyether segment has poor adhesion to the wood/straw, and the aqueous dispersion of polyurethane after sizing is evenly distributed on the shavings/fibers and cuts off the adhesion of the isocyanate binder (agent A) to the surface of wood/stalk.

The invention claimed is:

1. A no-added formaldehyde composite wood product binder, comprising agent A and agent B, wherein the agent A is an isocyanate binder, and the agent B is an aqueous dispersion of a polyester-based aliphatic polyurethane and/or a modified polyester-based aliphatic polyurethane;
   wherein the modified polyester-based aliphatic polyurethane is the polyester-based aliphatic polyurethane modified with a polymerizable vinyl monomer based polymer, which is obtained by chemically bonding of the polyester-based aliphatic polyurethane with a polymer of polymerizable vinyl monomers;
   wherein the isocyanate binder as agent A is a polymethylene polyphenyl polyisocyanate and/or a derivative thereof, and has a NCO value of 20-33%, a functionality of 2.1-3.3, and a viscosity of 50-2000 cp (25° C.); the derivative of the polymethylene polyphenyl polyisocyanate is obtained by reacting a polymethylene polyphenyl polyisocyanate with a polyol;

wherein the polyester-based aliphatic polyurethane in the aqueous dispersion of a polyester-based aliphatic polyurethane as agent B has a number average molecular weight of 50000 to 500000 Dalton, and a glass transition temperature of −30° C.-5° C.;

wherein the weight ratio of agent A to agent B is 1-5:1;

wherein the aqueous dispersion of a polyester-based aliphatic polyurethane and/or a modified polyester-based aliphatic polyurethane as agent B has a solid content of 20 to 60 wt %.

2. The no-added formaldehyde composite wood product binder according to claim 1, wherein agent B is the aqueous dispersion of a polyester-based aliphatic polyurethane, which is obtained by high-speed shearing and dispersing of the polyester-based aliphatic polyurethane in water; and the polyester-based aliphatic polyurethane is polymerized with the components comprising an aliphatic diisocyanate, a polyester polyol, a chain extender containing a hydrophilic group, and optionally a chain extender without a hydrophilic group.

3. The no-added formaldehyde composite wood product binder according to claim 2, wherein the molar ratio of the NCO group in the aliphatic diisocyanate/hydroxyl group in the polyester polyol/the sum of the hydroxyl group and the amino group in the chain extender containing a hydrophilic group/the sum of the hydroxyl group and the amino group in the chain extender without a hydrophilic group is 1:(0.2-0.9):(0.02-0.3):(0-0.7).

4. The no-added formaldehyde composite wood product binder according to claim 2, wherein the aliphatic diisocyanate is selected from the group consisting of hexamethylene diisocyanate, dicyclohexylmethane diisocyanate, isophorone diisocyanate, cyclohexane dimethylene diisocyanate and any combination thereof;

the polyester polyol is an adipic acid-based polyester diol, an aromatic polyester polyol or a polycaprolactone-type polyol, and has a number average molecular weight of 400 to 8000 Daltons; preferably the polyester polyol is selected from the group consisting of polybutylene glycol adipate diol, polyethylene glycol adipate diol, polypropylene glycol adipate diol, polydiethylene glycol adipate diol, polyneopentyl glycol diol, polyethylene glycol butylene glycol adipate diol, polyethylene glycol propylene glycol adipate, polyhexamethylene adipate diol and polycaprolactone diol and any combination thereof, which have a number average molecular weight of 1000-5000 Daltons;

the hydrophilic group of the chain extender containing a hydrophilic group is selected from the group consisting of a carboxyl group, a sulfonic acid group, an ethoxy group, a propoxy group and an ethoxy propoxy group and any combination thereof; the chain extender containing a hydrophilic group is preferably one or more of dimethylolpropionic acid, dimethylolbutanoic acid, 1,2-dihydroxybutane-1-sulfonic acid, sodium ethylenediamine ethanesulfonate, and sodium salt of N-(2-aminoethyl)-2-aminoethanesulfonic acid);

the optional chain extender without a hydrophilic group is selected from the group consisting of polyols having a functionality of 2 to 3 and a carbon atom number of 2-30, polyamines having a functionality of 2 to 3 and a carbon atom number of 2 to 20 and any combination thereof; preferably selected from the group consisting of ethylene glycol, 1,4-butanediol, hexanediol, ethylenediamine, propylenediamine, butanediamine, isophoronediamine, 1,4-cyclohexanediamine, 4,4'-diaminodicyclohexylmethane, diethylenetriamine and any combination thereof.

5. The no-added formaldehyde composite wood product binder according to claim 1, wherein agent B is the aqueous dispersion of a modified polyester-based aliphatic polyurethane.

6. The no-added formaldehyde composite wood product binder according to claim 5, wherein the polymer of polymerizable vinyl monomers accounts for 5 to 50 wt % of the polyester-based aliphatic polyurethane.

7. The no-added formaldehyde composite wood product binder according to claim 6, wherein the method for preparing the aqueous dispersion of the modified polyester-based aliphatic polyurethane comprises the following steps:

(i) adding 0.01 to 2 parts by weight of an emulsifier and an initiator which is used in an amount of 0.1 to 0.5% by weight based on the total amount of the polymerizable vinyl monomers to 100 parts by weight of an aqueous dispersion of a polyester-based aliphatic polyurethane which is to be modified, to form an uniformly dispersed emulsion;

(ii) heating the emulsion to 60-90° C., and then adding the polymerizable vinyl monomer, and maintaining the temperature during the polymerization process until the reaction is complete;

(iii) further adding an initiator which is used in an amount of 0.1 to 0.5% by weight based on the total amount of the polymerizable vinyl monomers, and maintaining the temperature at 60 to 90° C. during the polymerization process until the reaction is completed, to obtain the aqueous dispersion of the modified polyester-based aliphatic polyurethane;

Wherein, the aqueous dispersion of a polyester-based aliphatic polyurethane which is to be modified used in step (i) is prepared by the following steps:

(1) pre-polymerization: mixing an aliphatic diisocyanate, a polyester polyol, a hydroxyl group-contained or amino group-contained polymerizable vinyl monomer, and optionally a chain extender without a hydrophilic group and/or a chain extender containing a hydrophilic group and polymerizing at 50-100° C. to obtain a prepolymer;

(2) dissolution: after cooling, thoroughly mixing the obtained prepolymer with acetone to dissolve the prepolymer;

(3) chain extension: adding a mixture of the chain extender containing a hydrophilic group, water and optionally the chain extender without a hydrophilic group to the prepolymer dissolved in acetone, and then continuing the polymerization reaction at 30-50° C. to obtain the polyester-based aliphatic polyurethane which is to be modified dissolved in acetone;

(4) dispersion: adding water under a shearing and dispersing, and removing the acetone, and then adding the optional emulsifier to obtain the aqueous dispersion of the polyester-based aliphatic polyurethane which is to be modified.

8. The no-added formaldehyde composite wood product binder according to claim 7, wherein in step (1), the number of moles of the hydroxyl group-contained or amino group-contained polymerizable vinyl monomer used is 0.2-5% of the number of moles of NCO groups contained in the aliphatic diisocyanate;

in step (4), the amount of the emulsifier is 0.1-0.5% by weight of the aqueous dispersion of the polyester-based aliphatic polyurethane which is to be modified;

in step (ii), the total mass of the polymerizable vinyl monomer added is 5 to 50% by weight of the polyester-based aliphatic polyurethane which is to be modified.

9. The no-added formaldehyde composite wood product binder according to claim 8, wherein the hydroxyl group-contained or amino group-contained polymerizable vinyl monomer includes one or more of hydroxyethyl (meth) acrylate, (meth)acrylic acid-β-hydroxypropyl ester, hydroxybutyl (meth) acrylate, and (meth) acrylamide;

the polymerizable vinyl monomer is selected from the group consisting of methyl (meth)acrylate, butyl (meth) acrylate, phenyl (meth)acrylate, ethyl (meth)acrylate, (meth)acrylic acid 2-ethylhexyl ester, benzyl (meth) acrylate, (meth)acrylic acid, (meth)acrylamide, styrene, α-alkylstyrene, (meth)acrylonitrile and any combination thereof.

10. A manufacturing method of a no-added formaldehyde composite wood product, with the no-added formaldehyde composite wood product binder according to claim 1, wherein the manufacturing method includes the following steps:

(1) diluting agent B of the no-added formaldehyde composite wood product binder with water, wherein the weight ratio of agent B to water is 0.5-4:1, to obtain a diluted agent B having a viscosity of ≤600 cp (250° C.);

(2) adding agent A of the no-added formaldehyde composite wood product binder and the diluted agent B to the wood and/or straw material, and then blending the wood and/or straw material with no-added formaldehyde composite wood product binder until the no-added formaldehyde composite wood product binder is uniformly distributed on the wood and/or straw material;

(3) forming and pre-pressing the wood and/or straw material mixed with the no-added formaldehyde composite wood product binder into composite wood products mat;

(4) molding the composite wood products mat pre-formed by hot pressing.

11. The manufacturing method according to claim 10, wherein in step (2), the total addition amount of agent A and agent B of the no-added formaldehyde composite wood product binder is 1-6% by weight, preferably 2-5% by weight of the wood and/or straw material.

12. The manufacturing method according to claim 11, wherein in the above step (2), agent A and the diluted agent B are separately added into the wood and/or straw material in any order, or, all or part of agent A with all of the diluted agent B are mixed to obtain a mixture of agent A and agent B, and then add the mixture of agent A and agent B into wood and/or straw material; if the unmixed part of agent A exists, then the unmixed part of agent A is added to wood and/or straw material prior to or after the mixture of agent A and agent B.

13. The manufacturing method according to claim 12, wherein in step (2), the part of agent A for mixing with the diluted agent B accounts for 40-100% of the total of agent A by weight.

14. The manufacturing method according to claim 10, wherein in step (3), the wood and/or straw material mixed with the no-added formaldehyde composite wood product binder is heated to 40-75° C. before pre-pressing; in step (4), the hot pressing temperature is 170-240° C.

15. A no-added formaldehyde composite wood product, whose raw material comprising the following components: (1) a wood and/or straw material; (2) the no-added formaldehyde composite wood product binder according to claim 1, the account of which is 1-6 wt %, preferably 2-5 wt % of the wood and/or straw material.

16. The no-added formaldehyde composite wood product binder according to claim 1, wherein the aqueous dispersion of a polyester-based aliphatic polyurethane and/or a modified polyester-based aliphatic polyurethane as agent B has a solid content of 40 to 60 wt %.

17. The no-added formaldehyde composite wood product binder according to claim 9, wherein the polymerizable vinyl monomer is selected from the group consisting of methyl (meth)acrylate, butyl (meth)acrylate, phenyl (meth) acrylate, styrene, α-alkylstyrene and ethyl (meth)acrylate and any combination thereof.

18. The no-added formaldehyde composite wood product binder according to claim 17, wherein the polyester-based aliphatic polyurethane modified with a polymerizable vinyl monomer based polymer is the polyester-based aliphatic polyurethane modified with a copolymer of a phenyl (meth) acrylate and methyl (meth) acrylate or styrene; wherein the molar ratio of the phenyl (meth) acrylate monomer to the methyl (meth) acrylate or styrene monomer is 1-3:1 in the copolymer.

* * * * *